Patented Dec. 13, 1938

2,139,712

UNITED STATES PATENT OFFICE 2,139,712

AROMATIC MERCURY GLUCONATES AND PROCESS OF MAKING THE SAME

Carl N. Andersen, Wellesley Hills, Mass., assignor to Lever Brothers Company, a corporation of Maine No Drawing. Application January 8, 1938, Serial No. 184,035

3 Claims. (Cl. 260—434)

The present invention relates to certain new aromatic mercury gluconates.

It is an object of my invention to produce new aromatic mercury gluconates that are useful as germicides and for other purposes.

I have discovered that when the acidic hydrogen atom of gluconic acid is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $RHg.R_1$, in which R represents an aromatic structure to a carbon atom of which the mercury is directly attached; and in which $R_1$ represents the gluconic acid radical that is linked to the RHg group through the replacement of acidic hydrogen.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for any mono or polycyclic hydrocarbon group in which all of the nuclear carbon atoms, other than the one attached to mercury, and any side chain carbon atoms, have their valences satisfied either by carbon or hydrogen. Examples are the phenyl, diphenyl, tolyl, xylyl and naphthyl groups.

The method by which the compounds are prepared, as well as the number of compounds I have investigated, shows that all of the compounds within the generic group above mentioned may be prepared. They have in greater or lesser, but always in a relatively high degree, antiseptic and germicidal properties. I therefore, regard my invention as generic to and including the entire group of aromatic mercury salts of gluconic acid as defined heretofore.

The general method of producing these new compounds consists in reacting together gluconic acid and a compound containing an aromatic mercury radical of the above defined type. A liquid reacting medium is preferably employed. The compound resulting from the reaction is usually relatively insoluble as compared with the reacting components and upon its precipitation may be filtered, washed and dried. The aromatic mercury compound I prefer is the hydroxide because in the reaction of the hydroxide with the acid, water is the only other product produced and the resulting aromatic mercury salt may be easily purified. My novel compounds may also be prepared by employing a soluble aromatic mercury salt, for example, the acetate or lactate, in a reaction with gluconic acid. The aromatic mercury salt formed during the reaction is of a relatively low solubility as compared with the gluconic acid and with the aromatic mercury salt formed during the reaction. Compounds may also be prepared by reacting a gluconic acid derivative, such as an ester, with an aromatic mercury compound to form the corresponding aromatic mercury salt. Any of these general methods may be employed in producing the compounds comprising this invention.

Any inert liquid may be used as the medium for carrying out the reaction, inasmuch as its only function is to bring the reacting components together. Water may be used because of its availability. Other solvents are equally as satisfactory, such as alcohol, acetone, benzol, and any other inert organic solvent or mixtures of any of these materials with each other or with water.

The process may be carried out at any temperature, for example, room temperature and it is not dependent upon the use of an elevated temperature. In most instances, however, I find that the use of heat facilitates the solution of reacting components and permits the use of solutions of greater concentration.

The reacting materials are generally employed in substantially theoretical quantities. In some cases, if desired, approximately 10% excess of the gluconic acid may be employed in order to insure complete conversion of the aromatic mercury compound.

The following is illustrative of the preferred method of preparing the compounds, and is illustrative of a representative organic mercury compound falling within the generic class heretofore described as constituting my invention:

5.88 grams of phenylmercury hydroxide is dissolved in 2 liters of water by heating to boiling. The solution is then filtered and to the filtrate is added 4.31 grams of gluconic acid in 200 cc. of water. The resulting mixture is then heated to boiling and allowed to stand for twelve hours before filtering. The precipitation begins immediately. The precipitate, after filtration, is washed thoroughly with warm water and dried. The resulting product is a white crystalline substance. It melts at 164° C. with decomposition, and is the compound phenylmercury gluconate.

Other similar compounds, for example, the tolylmercury gluconate and the naphthylmercury gluconate may be prepared by employing corresponding molecular amounts of tolylmercury hydroxide and naphthylmercury hydroxide, respectively.

From the above description, it will be readily apparent to one skilled in the art how other members of the above defined group may be prepared.

The compounds produced as above described are characterized by extraordinarily high potency as antiseptics and germicides. Tests in accordance with Circular 198, of the U. S. Dept. of Agriculture, described as the F. D. A. method, clearly indicate this excellence.

Thus, after an exposure of 15 minutes, an aqueous solution of phenylmercury gluconate kills standard cultures of *Eberthella typhi* (typhoid bacillus) at 37° C. in dilutions as great as 1:70,000. When tested against *Staphylococcus aureus* by the same method and at the same temperature, the compound killed this organism after 15 minutes exposure in a dilution of 1:30,000.

In addition to their germicidal properties, all of the compounds are characterized by relatively low toxicity. Because of these properties, it is possible to use them in extreme dilutions and in many situations where known germicides, because of toxic or other undesirable properties, cannot be employed. They may be administered externally and locally and in some cases may be administered internally with satisfactory results from the germicidal standpoint and without harmful effect.

The compounds retain their germicidal activity when incorporated in soap and various menstruums employed in preparing germicidal compositions. They may be employed in aqueous or other solutions and may be formed into various preparations such as mouth washes, tooth pastes, soaps, etc. The compounds may be used for other purposes such as sterilization of inanimate objects, particularly surgical equipment, and preventing the formation of mildew in sizes.

This application is a continuation-in-part of my application Serial No. 694,202, filed October 18, 1933.

I claim:

1. An organic mercury compound having the general formula $RHg.R_1$, in which R represents an aromatic structure to a carbon atom of which the mercury is directly attached and in which none of the carbon atoms has direct linkage with any element other than hydrogen, carbon and mercury, and in which $R_1$ represents the radical of gluconic acid that is linked to the RHg group through replacement of acid hydrogen.

2. Phenylmercury gluconate.

3. In a method of making phenylmercuric gluconate, the step of heating phenylmercuric hydroxide with gluconic acid to a reacting temperature in the presence of a substantially inert liquid.

CARL N. ANDERSEN.